United States Patent
Palmer et al.

(10) Patent No.: US 11,483,302 B2
(45) Date of Patent: Oct. 25, 2022

(54) DATA ISOLATION AND TWO-FACTOR ACCESS CONTROL

(71) Applicant: Open Text SA ULC, Halifax (CA)

(72) Inventors: Jody Hupton Palmer, Cambridge (CA); Nicholas Edward Scott, Waterloo (CA)

(73) Assignee: OPEN TEXT SA ULC, Halifax (CA)

( * ) Notice: Subject to any disclaimer, the term of this patent is extended or adjusted under 35 U.S.C. 154(b) by 0 days.

(21) Appl. No.: 17/481,117

(22) Filed: Sep. 21, 2021

(65) Prior Publication Data

US 2022/0006799 A1    Jan. 6, 2022

Related U.S. Application Data

(63) Continuation of application No. 16/870,682, filed on May 8, 2020, now Pat. No. 11,165,764.

(60) Provisional application No. 62/845,534, filed on May 9, 2019.

(51) Int. Cl.

| | |
|---|---|
| G06F 15/173 | (2006.01) |
| G06F 15/16  | (2006.01) |
| H04L 9/40   | (2022.01) |
| H04L 12/16  | (2006.01) |
| H04L 67/02  | (2022.01) |
| G06F 21/62  | (2013.01) |

(52) U.S. Cl.
CPC .......... *H04L 63/08* (2013.01); *G06F 21/6218* (2013.01); *H04L 12/16* (2013.01); *H04L 63/10* (2013.01); *H04L 67/02* (2013.01)

(58) Field of Classification Search
CPC ........ H04L 63/08; H04L 63/10; H04L 67/02; H04L 12/16; G06F 21/6218
USPC .................................. 709/202–203, 225–226
See application file for complete search history.

(56) References Cited

U.S. PATENT DOCUMENTS

| | | | |
|---|---|---|---|
| 9,053,136 B2    | 6/2015  | Kuruganti | |
| 9,237,156 B2    | 1/2016  | Mortimore | |
| 10,742,638 B1 * | 8/2020  | Fischer  | H04L 63/0428 |
| 2011/0270886 A1 | 11/2011 | An       | |
| 2012/0144501 A1*| 6/2012  | Vangpat  | H04L 63/0807 726/28 |
| 2012/0166488 A1*| 6/2012  | Kaushik  | G06F 21/6209 707/795 |

(Continued)

OTHER PUBLICATIONS

Office Action for U.S. Appl. No. 16/870,682, dated Mar. 16, 2021, 10 pgs.

(Continued)

*Primary Examiner* — Bharat Barot
(74) *Attorney, Agent, or Firm* — Sprinkle IP Law Group

(57) ABSTRACT

Systems, methods and computer program products for controlling access to data owned by an application subscriber using two-factor access control and user partitioning are disclosed. In one embodiment, applications are executed on a multi-tenant application platform in which user partitions designate associated users and authentication services for those users. Tenants may subscribe to the applications and may allow access to the subscriptions through designated entry points. Users that are authenticated according to the corresponding user partition and access the application through the designated entry point are allowed to access the application through the tenant's subscription.

17 Claims, 6 Drawing Sheets

(56) References Cited

U.S. PATENT DOCUMENTS

| | | | |
|---|---|---|---|
| 2013/0031613 A1 | 1/2013 | Shanabrook | |
| 2017/0126742 A1* | 5/2017 | Hopkins | H04L 63/08 |
| 2019/0163802 A1* | 5/2019 | MacLean | G06F 21/6218 |
| 2020/0242267 A1* | 7/2020 | Weiss | H04L 63/08 |
| 2020/0358752 A1 | 11/2020 | Palmer | |

OTHER PUBLICATIONS

Notice of Allowance for U.S. Appl. No. 16/870,682, dated Jun. 22, 2021, 8 pgs.

* cited by examiner

| Partition | Users |
|---|---|
| Acme (acme.com) | albert@acme.com<br>bob@acme.com |
| Midstate (midstate.com) | charles@midstate.com<br>david@midstate.com |
| Zenith (zenith.com) | ed@zenith.com |

FIG. 3A

| Tenant | Users |
|---|---|
| Acme (acme.com) | albert@acme.com<br>bob@acme.com |
| Midstate (midstate.com) | charles@midstate.com<br>david@midstate.com |
| Zenith (zenith.com) | ed@zenith.com |

FIG. 3B

| Tenant | Subscriptions | Users |
|---|---|---|
| Acme (acme.com) | Acme-CFSF1<br>Acme-CFSF2<br>Acme-CC1 | albert@acme.com<br>bob@acme.com<br>charles@midstate.com<br>david@midstate.com<br>ed@zenith.com |
| Midstate (midstate.com) | Midstate-CFSF1<br>Midstate-CFSF2<br>Midstate-CC1 | |
| Zenith (zenith.com) | | |

FIG. 3C

| Tenant Partition | Child Partition | Users |
|---|---|---|
| Orange | Orange-Native | srini@orange.com |
|  | Orange-SAML1<br>domain:orange.com<br>idp: orange.com | nick@orange.com<br>ravi@orange.com |
|  | Orange-SAML2<br>domain:orange.eu<br>idp: orange.eu | ross@orange.eu |
|  | Orange-SAML3<br>domain:<blank><br>idp: orange.okta.com | ted@xyz.com<br>john@xyz.com |
| ABC | ABC-Native | john@abc.com<br>srini@orange.com |
|  | ABC-SAML1<br>domain:abc.com<br>idp: abc.auth.com | mark@abc.com |
|  | ABC-SAML2<br>domain:<blank><br>idp: abc.ping.com | smith@ccc.com<br>nancy@aaa.com<br>ted@xyz.com |

FIG. 4A

| Site | Subscriptions | Users | | |
|---|---|---|---|---|
|  |  | User | Site ID | Partition ID |
| Orange (orange.com) | Orange-CFSF1<br>Orange-CFSF2<br>Orange-CC1 | srini@orange.com | Orange | Orange-Native |
|  |  | nick@orange.com | Orange | Orange-SAML1 |
|  |  | ravi@orange.com | Orange | Orange-SAML1 |
|  |  | ross@orange.eu | Orange | Orange-SAML2 |
|  |  | ted@xyz.com | Orange | Orange-SAML3 |
|  |  | john@xyz.com | Orange | Orange-SAML3 |
| ABC (abc.com) | ABC-CFSF1<br>ABC-CFSF2<br>ABC-CC1 | john@abc.com | ABC | ABC-Native |
|  |  | srini@orange.com | ABC | ABC-Native |
|  |  | mark@abc.com | ABC | ABC-SAML1 |
|  |  | smith@ccc.com | ABC | ABC-SAML2 |
|  |  | nancy@aaa.com | ABC | ABC-SAML2 |
|  |  | ted@xyz.com | ABC | ABC-SAML2 |

FIG. 4B

DATA ISOLATION AND TWO-FACTOR ACCESS CONTROL

RELATED APPLICATIONS

This application is a continuation of, and claims a benefit of priority under 35 U.S.C. 120 of, U.S. patent application Ser. No. 16/870,682 filed May 8, 2020, issued as U.S. Pat. No. 11,165,764, entitled "DATA ISOLATION AND TWO-FACTOR ACCESS CONTROL," which claims the benefit of priority under 35 U.S.C. § 119(e) to U.S. Provisional Application No. 62/845,534 filed May 9, 2019, entitled "DATA ISOLATION AND TWO-FACTOR ACCESS CONTROL", which are fully incorporated herein by reference for all purposes.

TECHNICAL FIELD

This disclosure relates generally to access control in a multitenant application platform, and more particularly to systems, methods and products in which users are required to access data associated with a subscribed application on a multitenant application platform through an entry point external to the application that is controlled by the owner of the data.

BACKGROUND OF THE RELATED ART

Traditionally, users have run applications on their own computers. In the context of enterprise computing, users have run applications on servers that are located on the premises of the organization or enterprise (e.g., in server machines that physically reside in a building of the enterprise). This is sometimes referred to as "on-premises" or simply "on-prem". For example, enterprise class systems such as enterprise content management (ECM) systems may utilize on-premise content servers to store and manage an organization or enterprise's digital assets (e.g., content and documents). To protect these managed objects, the content server conventionally operates behind the enterprise's firewall, and is configured so that only authorized users within the enterprise may have secure access to the managed objects.

It may, however, be desirable for users associated with the enterprise to collaborate and/or share enterprise content (documents or other managed objects) with other users. External users (those who are not associated with the enterprise or who are not on-premise) are generally not authorized to access the enterprise's applications or content, so they cannot normally view and/or edit any of the restricted files managed by the enterprise's content server.

When the need arises for an external user to review and/or edit a file, one common option is for an enterprise user to transfer a copy of the file to a location that is accessible by the external user. For instance, the enterprise user may log into the enterprise content server from within the enterprise network where the content server resides, retrieve the file, and share a copy of the file with the external user via email or through a cloud-based storage system that is open to the public. Once that copy is shared outside of the enterprise network, it is no longer under management by the enterprise content server, so the content server has no way of tracking the shared copy, getting the shared copy back to the content server, and/or updating the original file to reflect any changes made to the shared copy.

More frequently, enterprise class systems have moved toward cloud hosting for their computing operations. These systems may use applications that are executed in a multitenant environment. The cloud-based environment may store content for multiple different enterprises, and therefore implements security measures to ensure that only authorized users associated with a particular enterprise are allowed to access the content owned by that enterprise. The content may, for instance, be encrypted with an encryption key that is controlled by the corresponding enterprise. The enterprise may configure access permissions to the managed objects to allow access by enterprise users to the content.

It may be the case that enterprise users need to collaborate with external users on managed objects owned by the enterprise. Administrators of the enterprise may be able to configure access to the managed objects by the external users. For example, the administrators may separately allocate the external users on the system so that the external users can access the managed objects that are the subject of the collaboration. The administrative burden associated with having to do so, however, may be prohibitive. Further, enabling access to managed objects may require that external users download and install specific applications, or access documents through a virtual private network (VPN) or secure on-premise backend server. Still further, tenant administrators may need to reconfigure access permissions or otherwise revoke authorization for external users to access documents when the collaboration is complete. Still further, if the tenant administrator can only change access permissions through the application, it may not be possible to change these permissions as quickly as required in some situations.

It may also be difficult to control the authentication of external users who may need to access to managed objects owned by the enterprise in order to collaborate with internal enterprise users. For example, although an enterprise may selectively authorize particular external users to access particular data, the authentication of these users is normally determined by their own respective domains (which are external to the enterprise), rather than by the enterprise itself. Consequently, there may be a scenario in which a user (who is external to an enterprise) may be authenticated by a domain that only requires a username and a simple password, but the user may be given access to data that is owned by the enterprise, which requires stronger passwords and two-factor authentication. As a result, the external user may be allowed access to the data, even though the user was authenticated under much less stringent authentication requirements than those of the enterprise.

It would therefore be desirable to provide technical solutions that resolve one or more of the problems described above.

SUMMARY OF THE DISCLOSURE

Embodiments disclosed herein can address the problems discussed above and provide additional technical solutions and benefits. These embodiments may implement data isolation using a two-factor access control paradigm, as well as partitioning of users that have access to tenants' subscriptions. One of the factors in the two-factor access control paradigm is data isolation at the application level, while the other is a login through a specific entry point (e.g., URL). The granularity of data isolation at the application level is increased by enabling the partitioning of data so that within an application, particular groups of users are allowed different levels of data access, or access to different sets of data. Data associated with a particular tenant-subscriber in a multitenant platform may be segregated for purposes of confidentiality, compliance with rules or regulations, or various other reasons. This segregation may occur not only between different tenant-subscribers on the platform, but also between groups or individual users within a particular tenant. The segregation of data at this level is typically managed by an administrator for the tenant. Embodiments disclosed herein add to this application-level access control a second access control constraint which requires access to the application services through a specific entry point URL controlled by the tenant. A user's access to a tenant's data is therefore controlled at the level of the entry point login, and also at the level of the application. In other words, the system provides subscription level data isolation by the application, and also controls access to the application through the portal of the entry point.

Embodiments of the invention allow data owners to exercise direct control over access to their data associated with an application executing on a multitenant application platform without having to do so through the application itself. In these embodiments, users are required to access the owner's data through an entry point (e.g., a login page) that is controlled by the data owner. This allows the data owner to give users (e.g., external users that are not associated with the data owner) access to data so that the external users can collaborate (e.g., review, comment, edit, etc.) with respect to the data, but allows the data owner to quickly and directly alter or revoke the users' ability to access the data without having to rely on the access controls of the application, to which the data owner subscribes, but which it does not control. The data owner may also control user partitions, which may allow the tenant to control the authentication of the users to ensure data security consistent with the tenant's requirements, even when the users are external to the tenant. The user partitions may also be used to enable finer-grained control of the data that is accessible to particular sets of users.

Embodiments disclosed herein provide new systems, methods, and computer program products for data isolation with two-factor access control. While particular embodiments are disclosed below, additional aspects, features, and benefits of the invention and example embodiments are provided in the accompanying Appendix A, which forms part of this disclosure.

One embodiment comprises a method for controlling access to data owned by an application subscriber. The method comprises providing a multi-tenant application platform and executing one or more applications on the multi-tenant application platform. The multi-tenant application platform enables subscription-based access to the one or more applications. The multi-tenant application platform further enables a site owner to designate a plurality of user partitions within a tenant; each user partition designating a corresponding set of users and a corresponding authentication service. For each of the application subscriptions, the multi-tenant application platform enables the site owner to authorize a plurality of users to access the subscriptions and to identify one or more corresponding entry points. The multi-tenant application platform the enables access by each of the plurality of users to each subscription only if the user is authenticated by the authentication service designated in the user partition corresponding to the user, and the user accesses the subscription through an entry point designated for the subscription.

In some embodiments, the multi-tenant application platform enables a single email address to be used to simultaneously access a first subscription of a first site owner as a first user and a second subscription of a second site owner as a second user. Access of the first user to the first subscription is isolated from access of the second user to the second subscription, so that no data is shared across site boundaries. In some embodiments, the authentication service designated in the user partition corresponding to the user may be different from an authentication service designated by a domain of the user's email address. In some embodiments, the multi-tenant application platform may determine, in response to a user attempting to access the subscription through the entry point designated for the subscription, whether the user is included in a subscribed user list that is associated with the entry point designated for the subscription. In response to determining that the user is not in the subscribed user list that is associated with the entry point designated for the subscription, the multi-tenant application platform will deny access by the user to the subscription. In some embodiments, the entry point comprises a URL that is owned by the one of the one or more tenants that is subscribed to the application. This URL may comprise a login page, where the site owner administers an associated list of authorized users that may login through the URL. In some embodiments, the user is an external user whose email address has a domain which is different than the domain of the site owner.

One alternative embodiment comprises a system having a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIGS. 3A-3C depict a set of tables which illustrate user access in a system in which there is no user partitioning and a primary tenant owns each user record.

FIGS. 4A-4B depict a set of tables illustrating the partitioning of users in accordance with some embodiments.

DETAILED DESCRIPTION

Figure 1:
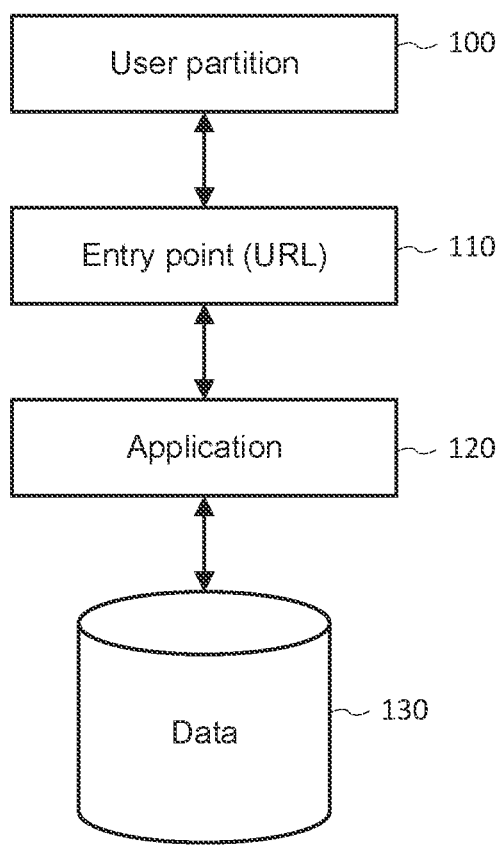
FIG. 1 depicts a diagrammatical representation of the two-factor access control implemented in a multi-tenant application platform according to some embodiments.

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Embodiments disclosed herein address the issue of how to isolate data while allowing colleagues to share data in a multitenant platform. For example, a particular cooperative organization may have member organizations that are each involved in a collaborative project. In the course of the collaborative project, each of the member organizations may utilize both shared data which is accessible to multiple member organizations and proprietary data which the respective member organizations may not wish to share with other member organizations. Thus, each member organization may need to be able to invite particular users who may be associated with other member organizations to access particular proprietary resources while preventing access to other proprietary resources. Thus, collaborators may access the resources as allowed by the owners of the resources, while maintaining the owners' control of the resources.

This issue is addressed by providing means to secure data by implementing data isolation with two-factor access control and user partitioning at the site level within a tenant. Embodiments may meet several needs that are not served by current systems. For example, it is desirable to enable one person with a single corresponding email address to access to different sites as two different users, each of which is under the control of a separate organization, where data is isolated between the two organizations. It is further desirable to enable developers to build applications that can share data within a single organization. It is also desirable to enable two different organizations that can access a particular application to share data across the organizations.

Embodiments disclosed herein therefore implement data isolation within a subscription with two-factor access control for data associated with an application that includes elements both internal to the application and external to the application. External control is implemented through a user entry point which is directly controlled by an application subscriber that is the owner of the data. By requiring that a user access the subscriber-owner's data through the entry point, the subscriber-owner can control (e.g., deny or revoke) the user's access to the data directly, without having to change the access controls implemented in the application. The subscriber-owner can also avoid the administrative burden of having to reconfigure access permissions with the application.

Embodiments disclosed herein further implement isolation of users within a tenant's subscription by enabling user partitioning within the tenant. This enables the control of users at the site level, rather than at the organizational level. User partitions are associated with individual sites, and the individual sites determine the access that associated users are granted to data for the corresponding sites. The user partitioning enables the sites to control the authentication required for users accessing data through the corresponding sites in order to maintain the desired level of security.

Referring to FIG. 1, a diagrammatical representation of the two-factor access control implemented in embodiments of the present invention is shown. As depicted in the figure, a user gains access to data 130 via a user partition 100, an entry point 110 and application 120. Application 120 is implemented on a cloud-based multitenant application platform. Application 120 is a SaaS (software as a service) application which is available to tenants who subscribe to the application. The application implements access controls in order to secure the data of each tenant and to prevent unauthorized access to a tenant's data by other, unauthorized tenants. These access controls are commonly configurable within the application by an administrator of each tenant.

As noted above, however, it is desirable in some situations for a tenant to be able to have more direct control of user access to its data. Present embodiments therefore implement an additional layer of access control at an entry point. This additional access control is enabled by requiring the user to access the data through a designated entry point that is owned and controlled by the tenant. The tenant may, for example, maintain a login page, and may provide the URL for the login page to users to whom it wishes to grant data access. The tenant may maintain a list of authorized users which is associated with this login page, and may modify the list to directly control the users who can access the application and the tenants data through the login page. The tenant may therefore enable or deny the users access at the entry point, and may thereby control access external to the application itself. This may allow the tenant to control (e.g., revoke) the users access more quickly and easily than if it is necessary for an administrator of the tenant to reconfigure access permissions within the application.

Still another layer of access control is implemented through user partitions. Embodiments disclosed herein enable tenants to define user partitions which group together sets of users, where the different sets of users are subject to authentication requirements that are site-specific for that user. Thus, when a person logs in to a particular site, the site can control the authentication of the user, even if the user is external to the tenant that owns the site. The tenant/site therefore does not have to rely on the authentication of the external user's domain to ensure that the authentication meets the tenant's security requirements. The user partitions may also provide finer-grained access control by enabling tenants to define different sets of data that are accessible by different sets of users, even if the users access the data through the same application. Thus, for example, one set of users (e.g., internal users) may be allowed to access to all of the tenant's data that is available through an application, while another set of users (e.g., external users) may be allowed access to a more limited set of data that is related to a particular project on which the external user is collaborating which internal users of the tenant.

Figure 2:
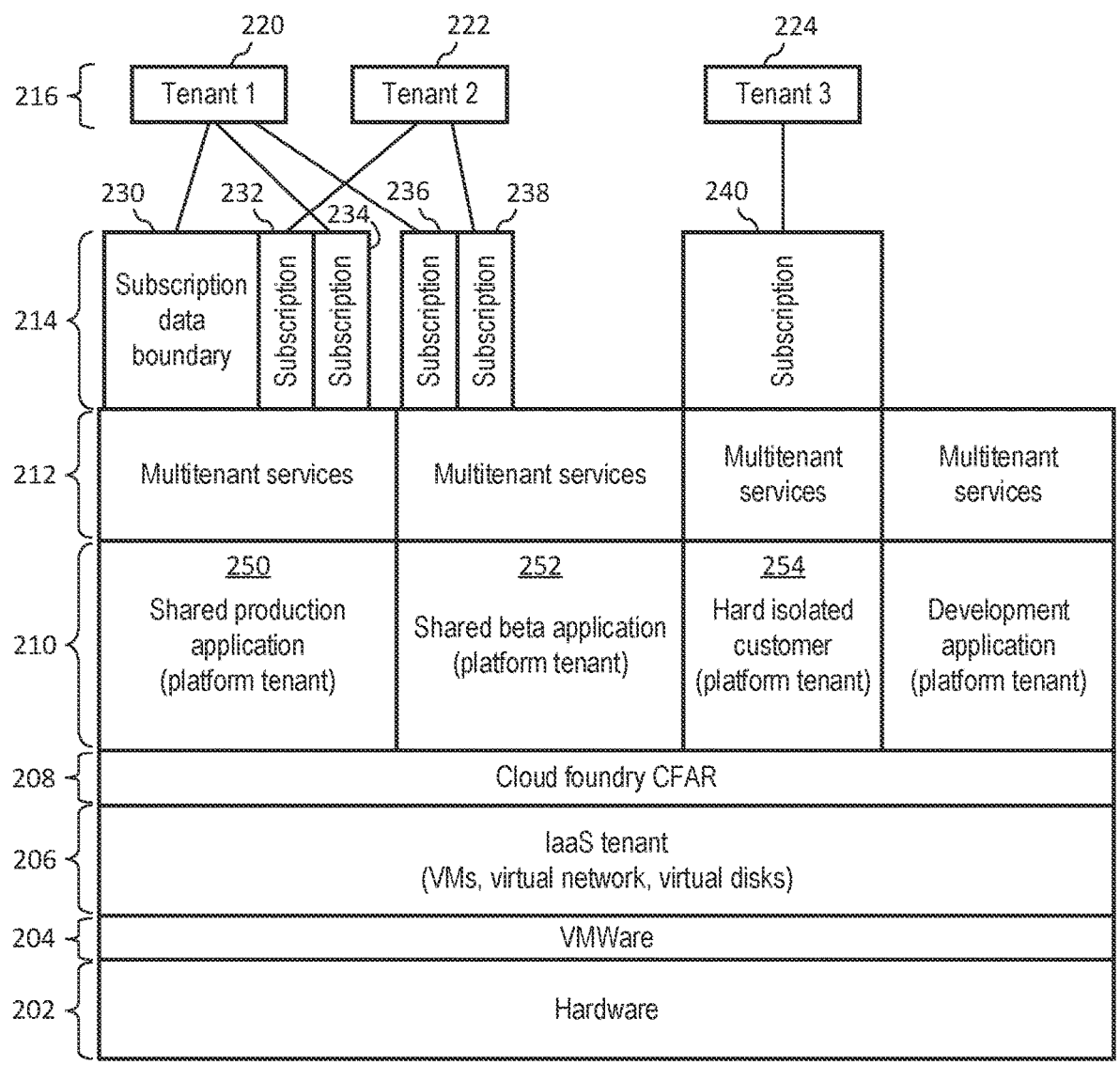
FIG. 2 depicts a diagrammatical representation of the structure of a multitenant application environment according to some embodiments.

Referring to FIG. 2, a diagrammatic representation of the structure of a multitenant application environment is shown. As depicted in this figure, a virtualization platform runs on a hardware layer 202. The virtual machines of the virtualization layer 204 support an IaaS (infrastructure as a service) layer 206. There may be several infrastructure tenants 210 that utilize the provided infrastructure for the cloud-based multitenant application platform 208. At this level, deep isolation between the tenants may be provided by implementing separate tables and services for the different tenants. The separate isolation segments may be useful to allow developers to work without disrupting production, and may provide a level of isolation required by highly risk-adverse customers. Various services 212 may be built within container boundaries that are provisioned on the cloud-based platform. Multitenant applications that use these services can then be provided to tenants 216 of the cloud-based platform. The tenants have subscription-based access to the applications.

Each tenant may have subscriptions 214 to one or more applications that are executing on the multitenant platform. The tenant can provision in its own users who are associated with the tenant (e.g., employees or agents of the tenant organization). Each tenant manages its own users and allows these users to access the application through its subscription.

In prior art systems, tenants of applications (subscribers to the applications) are typically the only ones who can access their respective data in the applications. In other words, a first tenant can access its own data, but it cannot access the data of other tenants, nor can the other tenants access the first tenant's data. Embodiments disclosed herein can enable tenants to access data across subscriptions, where authorized users of an application may use a designated entry point to access the data of tenants (subscribers) other than the tenant with which the user is associated. Thus, collaboration may be facilitated between users associated with a tenant and users that are external to the tenant, with respect to the tenant's data.

For example, a first tenant 220 may have subscriptions 230 and 234 to a first production application 250 and may store its own data on the multitenant platform through the application. Users internal to tenant 220 would normally have access to this data, but tenant 220 may also choose to enable access to this data by users of a different tenant (e.g., tenant 222). In some embodiments, second tenant 222 may be required to have its own subscription 232 to the application in order to access data through the application, although this may not be required in some alternative embodiments. Tenants 220 and 222 may likewise have subscriptions 236, 238 to other applications, such as beta application 252, and may choose to enable access by internal and external users to the data of the respective tenants in application 252. Application 254 is an example of an application that is dedicated to a single tenant 224 through a corresponding subscription 240.

As noted above, user partitions can be implemented to facilitate control of access to a tenant's data. Before describing user partitioning as implemented in embodiments of the present invention, it may be helpful to describe user access in conventional systems. Referring to FIGS. 3A-3C, a set of tables is shown to illustrate user access in a system in which there is no user partitioning and the primary tenant owns the user record. As shown in FIG. 3A, the system enables tenant partitions, so that the data of each tenant is isolated from the date of the other tenants. Thus, the data of tenant Acme (acme com) is isolated from the data of tenants Midstate (midstate.com) and Zenith (zenith.com). For each of these tenants, the users associated with that tenant (as determined by the domains of the users' respective email addresses) fall within the partition of that tenant. In this example, users albert@acme.com and bob@acme.com are within the Acme partition, while users charles@midstate.com and david@midstate.com are within the Midstate partition, and user ed@zenith.com is within the Zenith partition.

Referring to FIG. 3B, the association of each user with the corresponding tenant (and tenant domain) is graphically illustrated by the arrows. Because the system only provides partitioning of the tenant level, the users' access to the system is controlled at the tenant level. Thus, the authentication of a particular user is determined by the corresponding tenant, and the user's access to data is determined by the tenant. For example, user Charles (charles@midstate.com) falls within the Midstate tenant partition, so Midstate controls the authentication of this user. While this may not be problematic as long as each user only needs to access the resources of its own tenant, problems may arise when users attempt to collaborate across tenants.

Referring to FIG. 3C, an example of the interaction between different users and different tenants is illustrated. In this example, a tenant may have one or more subscriptions to applications and may wish to allow users who are external to the tenant to access its resources through its subscribed applications. For example, tenant Acme may have subscriptions Acme-CFS F1, Acme-CFSF2, and Acme-CC1, and may allow access to users albert@acme.com, david@midstate.com and ed@zenith.com.

In the case of albert@acme.com, the user falls within the tenant partition of Acme, so Acme determines the authentication that is required for this user to access its subscriptions and its data. In the case of david@midstate.com, this user is associated with the Midstate tenant, so Midstate controls the authentication of the user. If Midstate's authentication requirements are more stringent than those of Acme, the authentication may not be cause for concern in allowing this user to access Acme's subscriptions and/or data. If, however, Midstate's authentication requirements are less stringent than those of Acme, the authentication of user david@midstate.com may not meet Acme's security requirements. For instance, if Acme requires two-factor authentication, but Midstate requires only single-factor authentication, it may be easier for a person to gain unauthorized access to Acme's resources through this user email address than through an email address associated with the acme.com domain.

Referring to FIGS. 4A-4B, a set of tables illustrating the partitioning of users in accordance with some embodiments is shown. FIG. 4A illustrates the partitioning of users at the site level, rather than the tenant level. FIG. 4B illustrates the access to application subscriptions granted by each tenant to different users.

Referring to FIG. 4A, it can be seen that each tenant can configure one or more child partitions within the corresponding tenant partition. In this example, to tenants are indicated: Orange; and ABC. Each of the tenants have a native partition which is essentially equivalent to the conventional tenant partition. Each tenant also has several child partitions that correspond to different sites which are owned by the respective tenants. The tenants can specify for each of the sites a corresponding domain and a corresponding identity provider (IDP) or authentication service. Thus, for example, tenant Orange can configure a child partition for a first site which is identified as Orange-SAML1, which has the domain orange.com and specifies orange.com as the identity provider for authentication of users.

Each tenant can also specify users that are associated with their respective child partitions. The users may include users that are associated with the tenant (which owns the corresponding site), as well as users that are external to the tenant. In the example of FIG. 4A, the native partition of tenant Orange and the partitions for sites Orange-SAML1 and Orange-SAML2 include only internal users that are associated with the tenant (as identified by the orange.com domain in the users' email addresses). The partition for site Orange-SAML3, on the other hand, only includes external users that are associated with the XYZ.com domain. Tenant ABC has partitions that include users associated with multiple, different domains. The native partition of ABC includes both internal (john@ABC.com) and external (srini@orange.com) users. The partition for site ABC-SAML2 includes users from multiple domains that are external to tenant ABC.

Referring to FIG. 4B, a table illustrating users' access to the various subscriptions of different tenants is shown. This table identifies sites owned by the tenants, the sites' subscriptions, the users that are allowed access to the subscriptions, and the partitions associated with the users. The left side of the table shows the associations between the sites and their subscriptions. For example, site orange (at domain orange.com), which has three subscriptions: Orange-CFSF1, Orange-CFSF2, and Orange-CC1. site ABC (at domain abc.com) has subscriptions to the same three applications. The ownership of the subscriptions is indicated by the "Orange-" or "ABC-" in the subscription names.

Each site determines the users that are allowed to access each of its subscriptions. In the example of FIG. 4B, access to subscription orange-CFSF1 is given to users srini@orange.com, nick@orange.com and ross@orange.eu. Access to subscription orange-CFSF2 is given to users srini@orange.com and ted@xyz.com, and access to Orange-CC1 is given to users ravi@orange.com and john @xyz.com.

As noted above in connection with FIG. 4A, each site can configure user partitions that allow different users to be segregated into groups that are handled differently, particularly with respect to authentication. Thus, although users srini@orange.com, nick@orange.com and ross@orange.eu each have access to a common subscription (Orange-CFSF1), each of these users is assigned by the site to a different user partition. Specifically, srini@orange.com is assigned to the native partition of the site, nick@orange.com is assigned to partition Orange-SAML1, and ross@orange.eu is assigned to partition Orange-SAML2.

Each of the users is authenticated by the authentication service (identity provider) associated with the corresponding partition. Thus, srini@orange.com is authenticated by the default identity provider associated with the Orange site, nick@orange.com is authenticated by orange.com (which is defined for partition Orange-SAML1), and ross@orange.eu is authenticated by orange.eu (which is the defined identity provider for partition Orange-SAML2). Each of these three users must therefore be authenticated by a different identity provider prior to accessing subscribed application Orange-CFSF1.

Because each of the users that accesses a particular application is authenticated according to the user partition corresponding to the particular user, the owner of the subscription does not have to rely on the authentication requirements of the domain with which the user is associated. Instead, the subscription owner (the site) can control the authentication requirements by specifying the identity provider that must be used by users in a given user partition in order to access the subscription. Thus, if a user is granted access to multiple, different applications through different sites, the user may be authenticated using different authentication services at different times, providing different levels of security, depending upon which application (and corresponding data) is being accessed.

Effectively, a single person with a single corresponding email address may be considered to be two or more different users that are accessing applications through two or more different sites. Each of these users will have the same email address, but there is no conflict because each user exists only within the context of the corresponding site. When the user logs into a particular site through a designated entry point, the corresponding user partition is determined, the user is authenticated according to the user partition, and the authenticated user is given access to the site's subscription(s) according to the partition.

Consider, in the example of FIGS. 4A and 4B, user srini@orange.com. This user is included in the native partitions of each of the orange and ABC sites. Thus, when srini@orange.com accesses subscription Orange-CFSF1, the user must be authenticated according to the requirements of the orange.com site, but when the user accesses subscription ABC-CFSF1, the user must be authenticated according to the requirements of the ABC.com site. Similarly, ted@xyz.com is included in the orange-SAML3 user partition of the orange site and the ABC-SAML2 partition of the ABC site, so when this user accesses the Orange-CFSF2 subscription, it must be authenticated according to orange-.okta.com, but when the user accesses the ABC-CFSF1 subscription, the user must be authenticated according to abc.ping.com.

Figure 5:
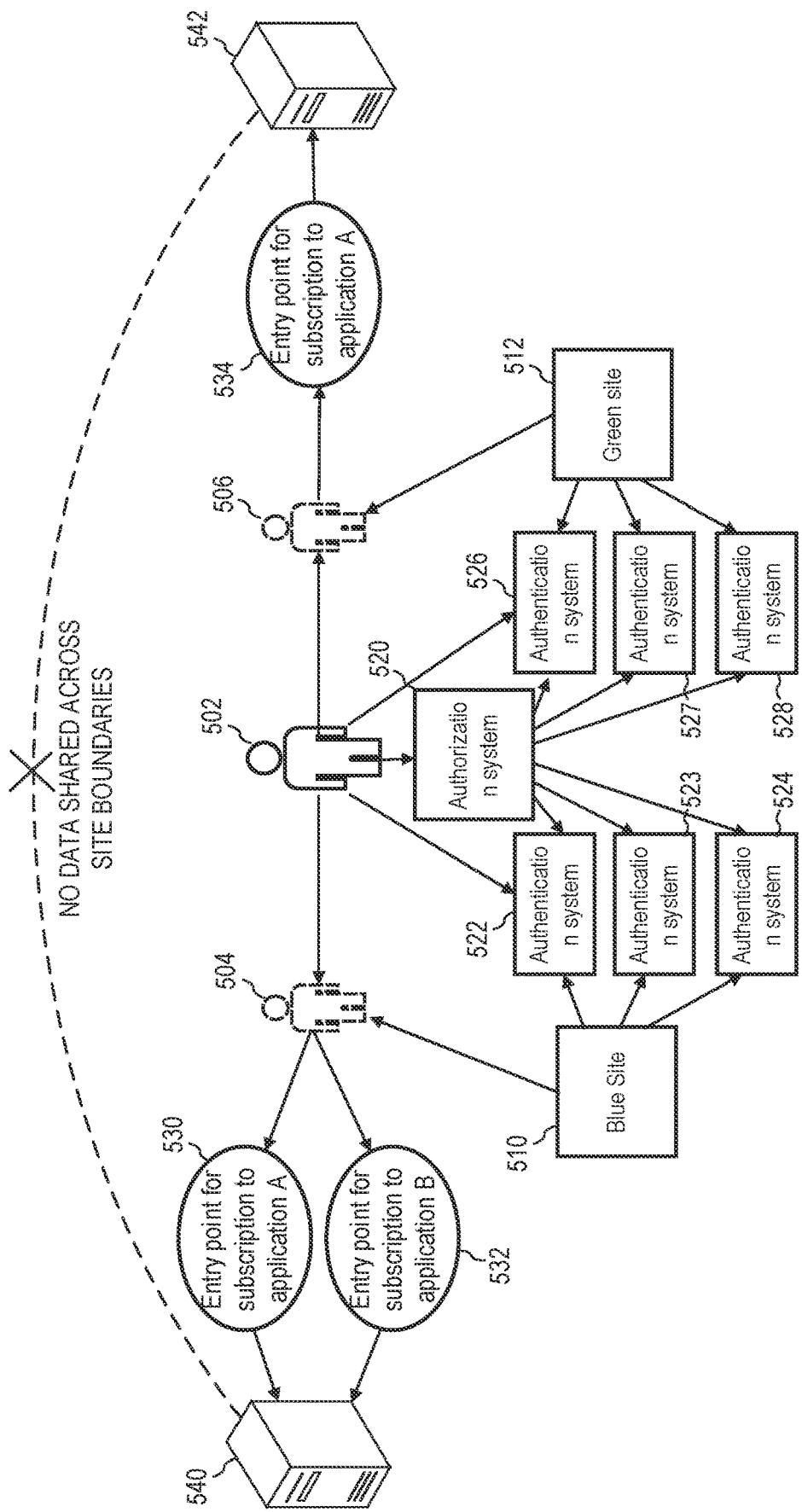
FIG. 5 depicts a diagrammatical representation of the use of user partitioning and entry-point access mechanisms to enable a person to access to different websites as two different users according to some embodiments.

The use of the security mechanisms to enable a person to access to different websites as two different users is illustrated in FIG. 5. In this example, a person 502 has a single corresponding email address (email-address@example.com). In a conventional system, this person could only be a single user having this email address, and this user would be authenticated according to the authentication service used by the corresponding domain. In the present embodiments, person 502 can log on to two or more different sites, and will be treated as a different user in each of these sites. The user in each site will fall within a corresponding user partition and will be authenticated by the authentication service designated for the respective one of the sites.

In the example of FIG. 5, person 502 can sign in to a first (blue) site 510 as a first user 504. Site 510 determines the user partition of user 504 and identifies the corresponding one of the authentication systems (522-524) which is designated for the user partition. Person 502 then interacts with the identified one of the authentication systems to authenticate the person as user 504. The authentication system may use any of a variety of authentication methods, such as single-factor, two-factor or multi-factor authentication, and the designated authentication system will have previously been selected by the owner of site 510 based on the sufficiency of the employed authentication methods. Person 502 will also interact with authorization system 520, which will determine whether or not the person is authorized to access the resources of site 510 as user 504.

When person 502 has been authenticated and authorized to access the resources of site 510 as user 504, the user may access one of the application subscriptions of the site through an available entry point. In this case, user 504 may access application A through a first entry point 530 or application B through a second entry point 532 when user 504 accesses the applications through one of these entry points, and access list for the corresponding entry point is checked to ensure that the user is allowed to access the corresponding application. If user 504 is allowed to access the application, access is allowed to the resources on server 540. The user may then proceed to use the application and access data as needed to perform the desired tasks/functions.

While person 502 is logged into the first site (510) as user 504, the person may also log into a second (green) site 512 as a second user 506. User 506 will have the same identifying email address as user 504, but is treated as a separate user. User 506 will login to site 512 in a manner similar to that of user 504. Site 512 will determine a user partition associated with person 502, but the user partitions in this case may be different from those used by site 510. Site 512 may have a different owner than site 510, or may have the same owner, but distinct purposes and requirements which require the use of different user partitions. When site 512 has identified the user partition of user 506, it can identify the designated authentication system (e.g., one of a plurality of authentication systems 526-528), and person 502 will proceed to authenticate user 506 with the designated authentication system. Person 502 will further interact with authorization system 520, and this system will determine whether or not the person is authorized to access the resources of site 512 as user 506.

When user 506 has been authenticated and it has been determined that the user is authorized to access the resources of site 512, the user may attempt to access the resources through an application having a corresponding entry.534. In this example, only a single entry point is available to allow user 506 two access the resources of site 512. When user 506 attempts to access this entry point, a corresponding access list is examined to determine whether or not the user has been granted access to the application via the entry point. If user 506 is included on the access list for the entry point, the user is allowed to proceed to access the resources on server 542.

As noted above, users 504 and 506, although having a common email address, are treated as different users. Consequently, although a single person having a single email address is accessing the resources of both site 510 and 512, the system does not share data across the site boundaries.

Figure 6:
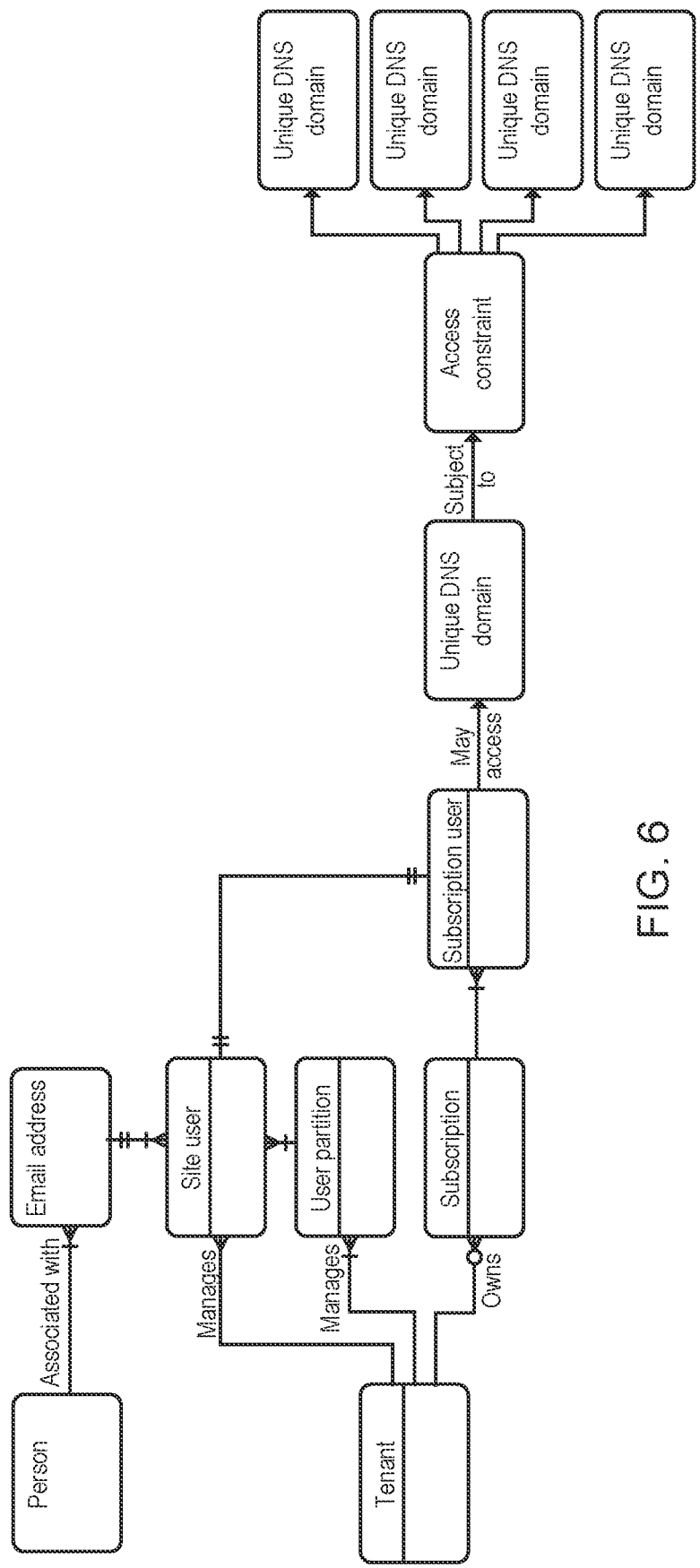
FIG. 6 depicts a diagrammatical representation of an entity relationship diagram for a system that implements access control according to some embodiments.

Referring to FIG. 6, an entity relationship diagram illustrating one embodiment of a system that implements access control as described herein is shown. As noted above, there may be one or more applications executing on the multi-tenant platform. Each of these applications is accessible through a subscription to the application. The subscription is associated with a specific tenant which may have multiple users associated with it. The users associated with the tenant are associated with the application through the tenant's subscription and may therefore be considered subscription users who are authorized to access the application. The subscription users may each be included in one or more user partitions that may be associated with the subscription and/or the application. These user partitions may be associated with corresponding authentication services and levels of access, so that when a tenant subscriber assigns a particular user to a specific user partition, the user will be authenticated according to the authentication service designated in the user partition and given the levels of access that are associated with the user partition.

In the embodiment of FIG. 6, the tenant's subscription to the application is associated with a unique DNS domain. This unique domain is used as an entry point for a user to obtain service from the application and thereby access the tenant's data. The user's access through the designated entry point may be subject to various access constraints. For example, one constraint is that the user must access the data through the designated entry point. The application may require that the user be included in a subscription list that is associated with the entry point. Additionally, in this embodiment, the user must have been authenticated by the authentication service designated by the tenant in the user partition for the user, and must have acquired appropriate tokens for accessing the application. Further, the permission of the user to access data may be application specific and may particularly specify the user's ability to access data across subscriptions and/or across tenants.

A subscriber tenant's delegation of access to its data through the use of role assignments or the direct provisioning of access is normally accomplished through the application and is limited to the users who are associated with the subscriber tenant (e.g., the tenant's employees). There may be circumstances, however, in which the subscriber tenant wishes to share access to its data with other users who are external to the tenant. Embodiments disclosed herein enable this type of access using a form of multi-factor access control. In these embodiments, the factors required for a user to access a first subscriber tenant's data associated with an application include the user being authenticated according to the identity provider (authentication service) identified in the corresponding user partition. The user must have subscription access to the application, though not necessarily through the subscriber tenant. The user must also access the data through an entry point which is designated by the subscriber tenant.

This provides the ability to control access to the data at several different levels. First, because the user must have subscription access to the application, control may be exercised through the application itself—the users access level may be controlled through normal management of access control lists, access levels associated with roles, direct delegation of access levels, etc. Second, because the user must access the data through a designated entry point (e.g., a URL controlled by the tenant subscriber), control may be exercised by the tenant subscriber (the owner of the data) external to the application through the management of the designated entry point. The tenant subscriber may thereby control access to the data external to the application itself by managing user access at the entry point. Allowing the tenant subscriber to control access at the entry point may provide a faster, simpler, and more convenient means to control access to its data (for example, by revoking a user's access at the entry point).

In one embodiment, a user logs into an application on a multitenant platform. The application is a subscription-based application and the user may be associated with a tenant that has a subscription to the application. When the user logs into the application, the user is authenticated and acquires a token having subscription scope (i.e., the token identifies the user as a known tenant-user with access to the application through the subscription of an associated tenant. The user can then attempt to access a URL that is an entry point for access to the data of another tenant subscriber (i.e., a tenant subscriber other than the one with which the user is associated). The entry point will then determine whether the user is identified as being authorized to access the data. If the user is authorized to access the data through the entry point, the user's access to the data will be allowed. Otherwise, the user will be prevented from accessing the data.

In some embodiments, the user attempting to access a first tenant subscriber's data must be authenticated through the first tenant subscriber. Users who have been authenticated and have obtained a token to access a first subscription may attempt to access a different subscription. If the user is in subscription lists for both subscriptions, the user may not be required to re-authenticate in order to access the second subscription (a single sign-on, or SSO, experience), unless the user has access to the different subscriptions through different user partitions that require different authentications. If the user attempting to access the second subscription is not on the subscription list for the second application, the user may be required to acquire a separate token to access the second subscription. The same data may, in some cases, be accessible from different subscriptions, depending upon the application. This may be determined by the application itself, while other applications may allow policies to be configured to allow or disallow access to the same data from different subscriptions.

Embodiments disclosed herein can provide a customer with control of a user's experience on the application when it is used to access the customers data. The user's experience may be through a web interface, a mobile device, or a desktop device. In the web-based experience, the user accesses the application through a domain name controlled by the customer and the customer performs the authentication of the user. The application is presented with the customer's "skin". When the application is accessed through a mobile or desktop device, API access will be through the customer domain name and authentication will be performed by the customer. Again, the application will use the customer's skin for the user's experience.

The customer has control over the users who are allowed to access their data. This may be accomplished by, for example the customer explicitly listing the names of individuals in both internal and external organizations who are allowed to access the data. The customer may remove individuals from the list or otherwise update the list in order to immediately change the ability of individual users to access the data. The user may be able to push the access list up from their Active Directory and may be able to manage it in the Active Directory.

The customer in this embodiment has control over the authentication rules that govern access by users to the customers data. This may include, for example, controlling the rules for authentication (e.g., two-factor authentication, password strength, etc.).

Embodiments disclosed herein provide technical solutions and benefits to the problems noted above, such as by implementing two-factor access control in applications executing on a multitenant platform so that data owners can exercise direct control over access to their data through the applications, and by partitioning users at the site level so that user access to data and applications can be differentiated between groups of users and so that user authentication can be controlled for both internal and external users of the system. Data owners can exercise this control both through the applications, and external to the applications. External control (via the entry point to the application, such as a login page) can be exercised without having to go through the application itself and may provide faster and more convenient means to control access.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

As is known to those skilled in the art, a suitable computer system can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like. ROM, RAM, and HD are non-transitory computer memories for storing computer-executable instructions executable by the CPU or capable of being compiled or interpreted to be executable by the CPU.

Suitable computer-executable instructions may reside on a non-transitory computer readable medium (e.g., ROM, RAM, and/or HD), hardware circuitry or the like, or any combination thereof. Within this disclosure, the term "non-transitory computer readable medium" is not limited to ROM, RAM, and HD and can include any type of data storage medium that can be read by a processor. Examples of non-transitory computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage media, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nano-engineered systems, components, and mechanisms may be used. In general, the functions of the invention can be achieved by any means as is known in the art. For example, distributed, or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the accompanying appendices, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and in the accompanying appendices, the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure. The scope of the present disclosure should be determined by the following claims and their legal equivalents.

What is claimed is:

1. A method for controlling access to data owned by an application subscriber, the method comprising:
   providing a multi-tenant application platform;
   executing one or more applications on the multi-tenant application platform,
   wherein the multi-tenant application platform enables subscription-based access by a data owner tenant to the one or more applications;

wherein the multi-tenant application platform enables the data owner tenant to designate a plurality of user partitions within the data owner tenant, each user partition designating a corresponding set of users and a corresponding authentication service;

wherein the multi-tenant application platform enables the data owner tenant to, for each of the one or more applications, authorize a plurality of users to access a subscription of the data owner tenant to the application and identify one or more corresponding entry points;

wherein, for each of the plurality of users, the multi-tenant application platform enables access to each subscription of the data owner tenant and corresponding data of the data owner tenant only if the user is authorized by the data owner tenant to access the data owner tenant's subscription to the application and authenticated by the authentication service designated in the user partition corresponding to the user, and the user accesses the subscription through a corresponding one of the one or more entry points designated for the subscription of the data owner tenant.

2. The method of claim 1, wherein the authentication service designated in the user partition corresponding to the user is different from an authentication service designated by a domain of an email address of the user.

3. The method of claim 1, further comprising: the multi-tenant application platform determining, in response to a user attempting to access the subscription through the entry point designated for the subscription, whether the user is included in a subscribed user list that is associated with the entry point designated for the subscription; and in response to determining that the user is not in the subscribed user list that is associated with the entry point designated for the subscription, denying access by the user to the subscription.

4. The method of claim 1, wherein the entry point comprises a URL that is owned by the one of the one or more tenants that is subscribed to the application.

5. The method of claim 4, wherein the URL comprises a login page, wherein the data owner tenant administers an associated list of authorized users.

6. The method of claim 1, wherein the user comprises an external user, wherein an email address of the external user has a domain which is different than a domain of the data owner tenant.

7. A computer program product for controlling access to data owned by an application subscriber, the computer program product comprising a non-transitory computer-readable medium storing instructions executable by a processor to cause the processor to perform:

providing a multi-tenant application platform;

executing one or more applications on the multi-tenant application platform, enabling, by the multi-tenant application platform, subscription-based access by a data owner tenant to the one or more applications;

enabling, by the multi-tenant application platform, the data owner tenant to designate a plurality of user partitions within the data owner tenant, each user partition designating a corresponding set of users and a corresponding authentication service;

enabling, by the multi-tenant application platform, the data owner tenant to, for each of the one or more applications, authorize a plurality of users to access a subscription of the data owner tenant to the application and identify one or more corresponding entry points;

enabling, by the multi-tenant application platform, for each of the plurality of users, access to each subscription of the data owner tenant and corresponding data of the data owner tenant only if the user is authorized by the data owner tenant to access the data owner tenant's subscription to the application and authenticated by the authentication service designated in the user partition corresponding to the user, and the user accesses the subscription through a corresponding one of the one or more entry points designated for the subscription of the data owner tenant.

8. The computer program product of claim 7, wherein the authentication service designated in the user partition corresponding to the user is different from an authentication service designated by a domain of an email address of the user.

9. The computer program product of claim 7, further comprising: the multi-tenant application platform determining, in response to a user attempting to access the subscription through the entry point designated for the subscription whether the user is included in a subscribed user list that is associated with the entry point designated for the subscription; and in response to determining that the user is not in the subscribed user list that is associated with the entry point designated for the subscription, denying access by the user to the subscription.

10. The computer program product of claim 7, wherein the entry point comprises a URL that is owned by the one of the one or more tenants that is subscribed to the application.

11. The computer program product of claim 10, wherein the URL comprises a login page, wherein the data owner tenant administers an associated list of authorized users.

12. The computer program product of claim 7, wherein the user comprises an external user, wherein an email address of the external user has a domain which is different than a domain of the data owner tenant.

13. A system for controlling access to data owned by an application subscriber, comprising:

a processor;

a data repository communicatively coupled to the processor; and a non-transitory computer-readable medium which stores instructions which are executable by the processor to cause the processor to perform:

providing a multi-tenant application platform;

executing one or more applications on the multi-tenant application platform, enabling, by the multi-tenant application platform, subscription-based access by a data owner tenant to the one or more applications;

enabling, by the multi-tenant application platform, the data owner tenant to designate a plurality of user partitions within the data owner tenant, each user partition designating a corresponding set of users and a corresponding authentication service;

enabling, by the multi-tenant application platform, the data owner tenant to, for each of the one or more applications, authorize a plurality of users to access a subscription of the data owner tenant to the application and identify one or more corresponding entry points;

enabling, by the multi-tenant application platform, for each of the plurality of users, access to each subscription of the data owner tenant and corresponding data of the data owner tenant only if the user is authorized by the data owner tenant to access the data owner tenant's subscription to the application and authenticated by the authentication service designated in the user partition corresponding to the user, and the user accesses the subscription through a corresponding one of the one or more entry points designated for the subscription of the data owner tenant.

14. The system of claim 13, wherein the authentication service designated in the user partition corresponding to the user is different from an authentication service designated by a domain of an email address of the user.

15. The system of claim 13, further comprising: the multi-tenant application platform determining, in response to a user attempting to access the subscription through the entry point designated for the subscription whether the user is included in a subscribed user list that is associated with the entry point designated for the subscription; and in response to determining that the user is not in the subscribed user list that is associated with the entry point designated for the subscription, denying access by the user to the subscription.

16. The system of claim 13, wherein the entry point comprises a URL that is owned by the one of the one or more tenants that is subscribed to the application, wherein the URL comprises a login page, wherein the data owner tenant administers an associated list of authorized users.

17. The system of claim 13, wherein the user comprises an external user, wherein an email address of the external user has a domain which is different than a domain of the data owner tenant.

* * * * *